United States Patent [19]

Nakahara

[11] Patent Number: 4,829,168
[45] Date of Patent: May 9, 1989

[54] OPTICAL MEMORY CARD

[75] Inventor: Takashi Nakahara, Tokyo, Japan

[73] Assignee: Canon Kabushiki Kaisha, Tokyo, Japan

[21] Appl. No.: 42,246

[22] Filed: Apr. 24, 1987

[30] Foreign Application Priority Data

Apr. 26, 1986 [JP] Japan ............................ 61-97579

[51] Int. Cl.⁴ .......................................... G06K 21/00
[52] U.S. Cl. ...................................... 235/489; 235/487
[58] Field of Search ............... 369/109, 275; 235/489, 235/487

[56] References Cited

U.S. PATENT DOCUMENTS 3,162,468 12/1964 Jonker ............................ 235/489
3,493,730 2/1970 Cilino ............................. 235/489
3,562,497 2/1971 Gastal ............................. 235/489
4,598,393 7/1986 Pierce ............................. 369/109
4,625,100 11/1986 Smith ............................. 235/489
4,629,873 12/1986 Stockburger ..................... 235/489

Primary Examiner—Harold I. Pitts
Attorney, Agent, or Firm—Fitzpatrick, Cella, Harper & Scinto

[57] ABSTRACT

An optical memory card subjected to optical information recording and reproduction, comprising, a card-like card body, an optical recording portion provided on said card body, and a light-transmitting portion formed in said card body for detecting an insertion state of said optical memory card in a card reader and/or writer.

6 Claims, 4 Drawing Sheets

OPTICAL MEMORY CARD

BACKGROUND OF THE INVENTION

The present invention relates to an optical memory card for recording and/or reproducing information upon beam radiation and, more particularly, to an optical memory card having a structure suitable for discriminating whether the card is properly inserted in a card reader when the card is inserted therein.

A conventional technique is available to determine whether an information recording medium is inserted in a normal position and a normal state in a recording or reproducing apparatus. A typical technique of this type is to detect the normal direction of the surface of the information recording medium by a reflection type photosensor according to a slight difference between the reflectances of the upper and lower surfaces of the recording medium. According to this technique, a detection result is unstable and a complicated electrical circuit is required, resulting in high cost. According to another conventional discrimination technique, a hole is formed in a floppy disk as in the conventional floppy disk, and the normal position of the floppy disk can be detected by determining whether a photosensor arranged inside the disk drive detects the hole.

SUMMARY OF THE INVENTION

It is an object of the present invention to provide an optical memory card subjected to optical information recording and reproduction, wherein a set state of the card can be easily discriminated when the card is inserted in a recording and/or reproducing apparatus and the memory card does not adversely affect recording and reproduction.

According to the optical memory card of the present invention, a hole or notch is formed in an optical memory card and is detected by a photosensor arranged inside the recording and/or reproducing apparatus, thereby discriminating the state of the optical memory card inserted in the recording and/or reproducing apparatus. Unlike in a floppy disk and a magnetic card, high-density information is recorded in or reproduced from the optical memory card. In the recording or reproduction mode, small vibrations must not act on the optical card. For this purpose, according to the present invention, the hole (notch) position of the optical memory card is selected as a position which is not brought into rolling contact with the card feed rollers. If the hole or notch of the optical memory card is associated with the card feed rollers, small vibrations are generated in the card, thus adversely affecting automatic focusing (AF) control and automatic tracking (AT) control.

In the optical memory card according to the present invention, in order to easily discriminate the upper and lower surfaces of the optical memory card upon insertion of the card in the recording and/or reproducing apparatus, a position of a light-transmitting portion of the card is offset from the center in the widthwise direction.

In the optical memory card according to the present invention, the hole or notch is offset from the center in the longitudinal direction of the card so as to detect the relationship between the leading and trailing ends of the card in addition to discrimination of the upper and lower surfaces of the card. In particular, when the card is set in the apparatus in a normal state, the hole (notch) position is located near the leading end of the card with respect to the center thereof along the longitudinal direction. This arrangement allows immediate detection of the card state upon insertion of the card in the apparatus, thereby preventing the recording surface of the card from being damaged due to an insertion error.

Furthermore, in the optical memory card according to the present invention, the diameter of the light-transmitting portion is preferably 0.7 mm or more in consideration of the optical characteristics of the commercially available photointerrupter. This indicates that the center of the light-transmitting portion must be 0.7 mm inside the end face of the card.

Furthermore, the position of the light-transmitting portion is sufficiently away from the recording portion so as to prevent the recording layer from being degraded due to moisture entered from the light-transmitting portion. If the light-transmitting portion is a hole, the hole may be sealed by transparent material such as a plastic plate so as to prevent permeation of moisture into the light-transmitting portion.

DESCRIPTION OF THE PREFERRED EMBODIMENTS

Figure 1:
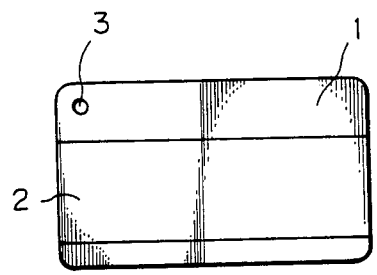
FIG. 1 is a plan view of an optical memory card according to an embodiment of the present invention.

FIG. 1 is a view showing an oblong optical memory card according to an embodiment of the present invention. The optical memory card comprises an optical memory card body 1. The card body 1 includes an optical recording portion 2 subjected to optical recording and/or reproduction. A hole 3 is formed in the card body 1 to detect an insertion state of the optical memory card body 1. The hole 3 is offset from the center along the widthwise and longitudinal directions of the card body 1.

Figure 2:
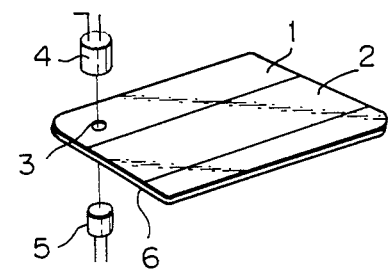
FIG. 2 is a perspective view showing an apparatus for detecting a hole formed in the optical memory card.

FIG. 2 shows an arrangement for detecting the hole 3 of the card body 1. The arrangement includes a light-transmitting LED 4 and a light-receiving LED 5. These LEDs are arranged at predetermined positions midway along the card feed path in the recording and/or reproducing apparatus. When the card is normally inserted in the apparatus, a beam from the light-emitting LED 4 is detected by the light-receiving LED 5 through the hole 3. The hole 3 is offset from the central portion of the card along the widthwise direction thereof. Even if the leading end of the card is inserted first but if the upper and lower surfaces of the card are reversed, the hole 3 is not located in the optical path between the light-emitting and light-receiving LEDs 4 and 5. Therefore, the light-receiving LED 4 does not receive light from the light-emitting LED 5. According to this method, the upper and lower surfaces of the card can be discriminated on the basis of an electrical signal from the light-receiving LED 5. Delicate adjustment of the apparatus is not required, and the circuit arrangement can be simplified to achieve accurate discrimination.

The insertion direction of the card body 1 can be detected as follows. The light-receiving LED 5 detects a moment when the short side of the card passes across the optical path between the light-emitting and light-receiving LEDs 4 and 5. A time between the above timing and a timing when the light-transmitting portion is detected is calculated. The measured time is compared with a predetermined time, thereby achieving the above discrimination. For this purpose, the position of the light-transmitting portion is offset toward either side from the central portion along the card longitudinal direction.

Figure 3A:
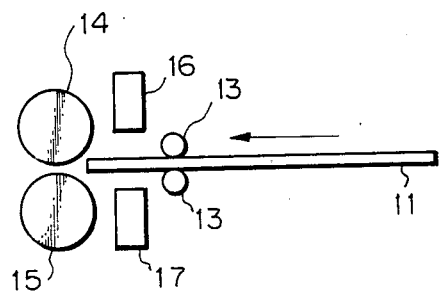
FIGS. 3A, 3B, and 3C are schematic views showing an arrangement of a card insertion section in an optical recording and-or reproducing apparatus.
Figure 3B:
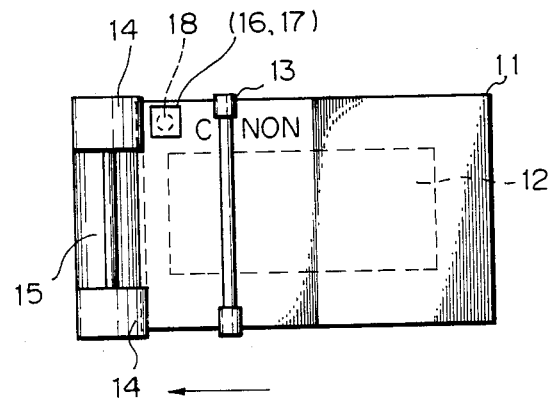
Figure 3C:
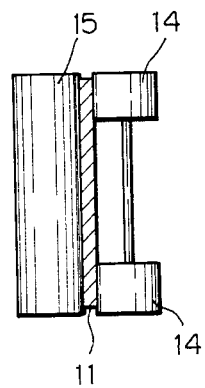

FIGS. 3A, 3B and 3C show an arrangement of a card insertion section in an optical recording and/or reproducing apparatus, in which FIG. 3A is a front view thereof, FIG. 3B is a plan view thereof, and FIG. 3C is a side view thereof. Referring to FIGS. 3A to 3C, an optical memory card 11 has a recording portion 12. The optical memory card 11 is fed by subfeed rollers 13 and feed rollers 14 and 15. A light-emitting LED 16 is located above the optical memory card 11 and a light-receiving LED 17 is located therebelow. The optical path between the light-emitting LED 16 and the light-receiving LED 17 is located between the subfeed rollers 13 have a size so that the rollers 13 are not brought into rolling contact with the recording portion 12 regardless of insertion states of the card. In order to properly transmit a driving force to the card, the feed rollers 14 and 15 have a size so as to bring them into contact with the recording portion 12 excluding the case wherein the card is normally inserted. While the card reaches the rollers 14 and 15 through the subfeed rollers 13, the light-receiving LED 17 detects a short side of the card 11 and then a light-transmitting portion 18.

Figure 4A:
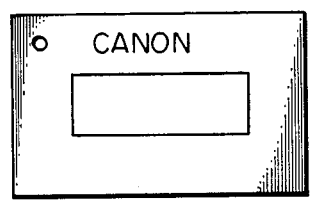
FIGS. 4A, 4B, 4C, and 4D are respectively schematic views showing states of a card inserted in the card insertion section.

When the card 11 is properly inserted, as shown in FIG. 4A, a waveform (a) can be output from the light-receiving LED 17. Time $\alpha$ indicates a timing when the leading short side of the card reaches the optical path between the LEDs 16 and 17; time $\gamma$ indicates a timing when the leading edge of the light-transmitting portion reaches the optical path; time $\delta$ indicates a timing when the trailing edge of the light-transmitting portion reaches the optical path; and time $\beta$ indicates a timing when the trailing end of the card 11 reaches the optical path. A duration between time $\alpha$ and time $\gamma$ is set to be a value obtained when the card is normally inserted in consideration of the card feed speed. When the preset value if compared with the measured duration between time $\alpha$ and time $\gamma$, whether the card is properly inserted can be discriminated.

Figure 4B:
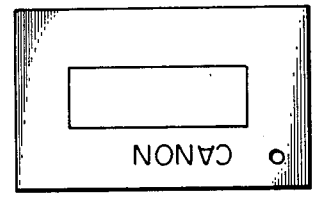
Figure 4C:
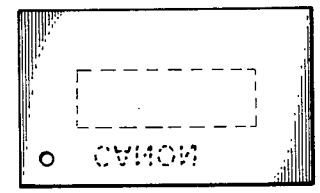
Figure 4D:
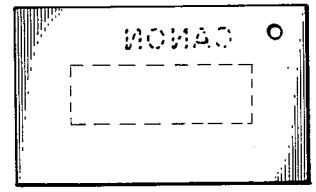
Figure 5:
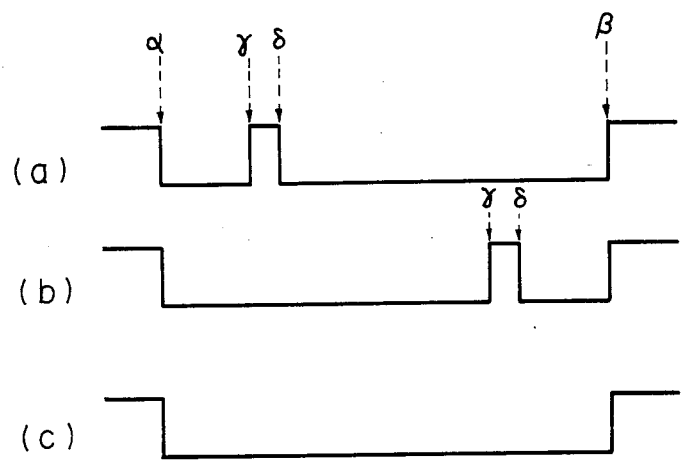
FIG. 5 is a timing chart of electrical signals generated by a light-receiving LED and corresponding to the states of the card inserted in the card insertion section.

As shown in FIG. 4B, even if the upper and lower surfaces of the card are proper but the trailing end of the card is inserted first, the signal (c) in FIG. 5 from the light-receiving LED 17 does not represent detection of the light-transmitting portion, thus detecting that the card is erroneously inserted. Even if the leading end of the card is inserted first but the upper and lower surfaces of the card are reversed, as shown in FIG. 4C, the signal (c) shown in FIG. 5 is generated by the LED 17, thus detecting that card insertion was wrong. If the trailing end of the card is inserted first and the upper and lower surfaces thereof are reversed, as shown in FIG. 4D, a signal (b) in FIG. 5 is generated by the LED 17. However, the duration between time $\alpha$ and time $\gamma$ is not the same as the predetermined time, thus detecting that card insertion was wrong.

In a practical apparatus, it is preferable that feed rollers 14 and 15 are not brought into rolling contact with the recording portion 12 of the optical memory card 11. After the LED 17 detects the leading short side of the card and if the leading edge of the light-transmitting portion is not detected within a predetermined period of time, the feed rollers are rotated in the reverse direction to discharge the card 11 outside the apparatus. In this case, it is preferable that the light-transmitting portion is located at the leading end portion along the widthwise direction of the card in the case of upon normal insertion of the card, as shown in FIG. 4A. Even if the card is erroneously inserted, the possibility of damage to the recording portion 12 is minimal.

Figure 6:
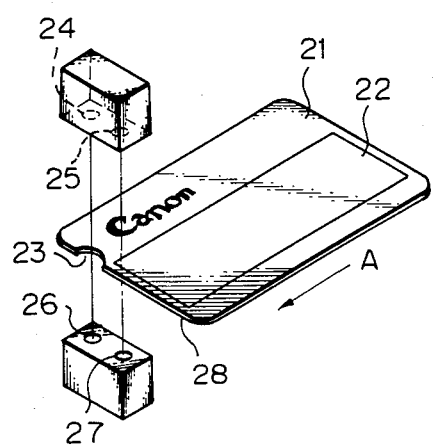
FIGS. 6 and 7 are schematic views showing states for detecting a notch of an optical card according to another embodiment of the present invention.
Figure 7:
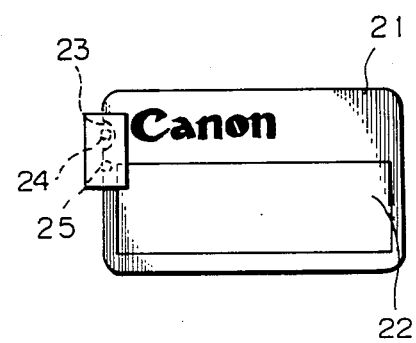
Figure 8:
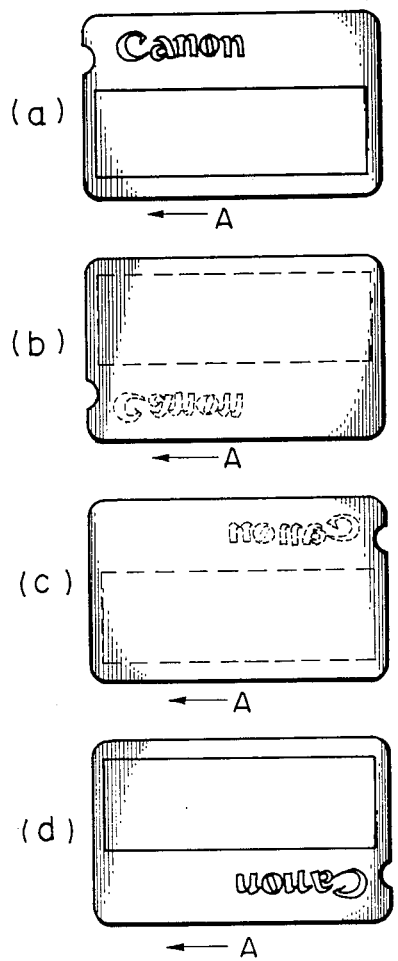
FIGS. 8(a) to (d) are respectively views showing states of the card (FIGS. 6 and 7) inserted in a card insertion section.
Figure 9:
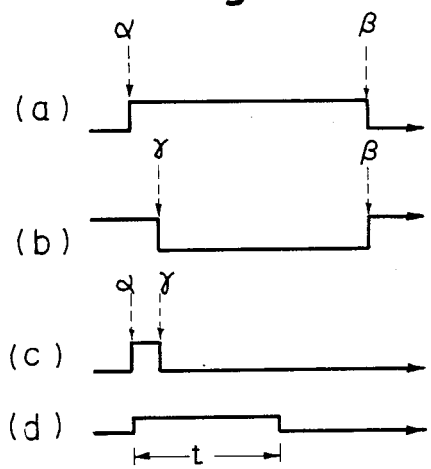
FIGS. 9 and 10 are timing charts of electrical signals generated by light-receiving LEDs and corresponding to the states of the card inserted in the card insertion section.
Figure 10:
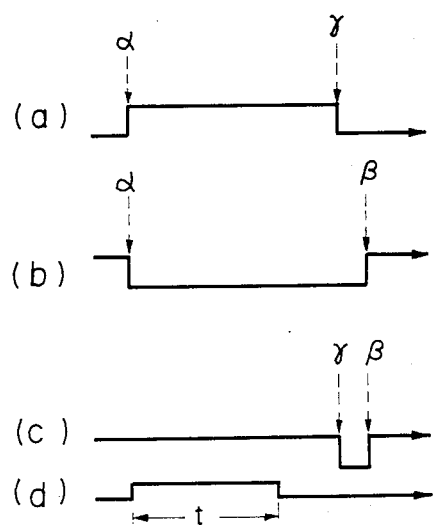

FIGS. 6 to 10 are views for explaining another embodiment of an optical memory card according to the present invention. FIG. 6 is a perspective view showing the relationship between a notch of the optical memory card and the card position detection light-emitting and light-receiving portions of the recording and/or reproducing apparatus, FIG. 7 is a plan view thereof, FIGS. 8(a) to (d) show card insertion direction of the optical memory card shown in FIG. 6, and FIGS. 9 and 10 are timing charts showing the relationship between the LED outputs and the card insertion directions.

Referring to FIG. 6, an optical memory card 21 is fed in a direction indicated by arrow A. The optical memory card 21 has an optical recording portion 22. A notch 23 is formed in a short side of the card 21. LEDs 24 and 25 are arranged to emit beams onto the card 21. LEDs 26 and 27 are arranged to receive the beams emitted from the LEDs 24 and 25, respectively. The notch 23 is formed sufficiently away from the optical recording portion 22. The alignment direction of the LEDs 24 and 25 is parallel to a short side 28 of the card.

Card insertion direction detection of the above arrangement will be described with reference to FIGS. 9 and 10.

FIG. 9 shows the signals generated by the light-receiving LEDs when the card is properly inserted. In this case, the light-receiving LED 27 generates an electrical signal (a) for detecting the card leading end. The signal (a) goes high at time $\alpha$ when the card leading end shields the beam from the light-emitting LED 25 and goes low at time $\gamma$ when the trailing end of the card passes a cross the optical path of the LEDs 25 and 27. The light-receiving LED 26 for detecting the notch of the card generates an output signal (b) which goes low when the notch shields the beam emitted from the LED 26 and goes high when the trailing end of the card passes across the optical path of the LEDs 24 and 26. A signal (c) in FIG. 9 is a sum of the output signals (a) and (b) in FIG. 9, i.e., the output signals from the LEDs 27 and 26. A signal (d) represents a detection time of a timer (not shown) for detecting the presence/absence of the notch. The electrical circuit is designed such that the timer is started in response to the fall time $\gamma$ of the signal from the LED 27 and operated for only a preset duration t as an effective detection period. If a signal appears for the present duration t, the circuit detects the presence of the notch 23.

FIG. 10 shows a case wherein card insertion is wrong. Signals represent a state shown in FIG. 8C. A signal (a) in FIG. 10 is an output from the LED 27, a signal (b) in FIG. 10 is an output from the LED 26, and signal (c) is a sum of the signals (a) and (b) in FIG. 10. A signal (c) in FIG. 10 represents the detection time as in the signal (d) in FIG. 9.

With the above arrangement, when the card 21, is properly inserted, the beam normally emitted from the LED 25 onto the LED 27 is shielded by a leading short side 28 of the card 21. The electrical signal from the LED 27 goes high. In this case, a trigger signal is supplied to a timer (not shown). The timer is started in response to the trigger signal. When the card is fed, the beam emitted from the LED 24 to the LED 26 is shielded by the leading edge of the notch 23. In this case, an output from the LED 24 goes low. The output signals from the LEDs 26 and 27 are binarized by other electrical circuits to obtain a pulse signal (c) in FIG. 9. Whether the pulse signal (c) in FIG. 9 appears within the duration t is to determine the presence/absence of the notch 23, i.e., proper/wrong insertion of the card.

If the card insertion direction corresponds to the state in FIG. 8(a), the signals in FIG. 9 are output and insertion direction is discriminated to be proper. However, if the card insertion direction corresponds to the state in FIG. 8(c), the output signals in FIG. 10 are generated and the insertion direction is discriminated to be wrong. In the states of FIGS. 8(b) and 8(d), the pulses (c) in FIGS. 9 and 10 are not generated, and the insertion direction is discriminated to be wrong. Therefore, only the proper insertion direction can be properly detected.

What is claimed is:

1. An optical memory card usable for optical information recording and reproduction in a card reader and/or writer, the card reader and/or writer including drive means for transporting said optical memory card, said optical memory card comprising:
   a rectangular card-like card body;
   an optical recording portion provided on said card body; and
   a light-transmitting portion formed in said card body for detecting an insertion state of said optical memory card in the card reader and/or writer, said light-transmitting portion being offset from the center of said card body in the widthwise and longitudinal directions thereof, and, when the drive means is transporting said optical memory card, being disposed in a position away from the drive means of the card reader and/or writer.

2. An optical memory card according to claim 1, wherein said light-transmitting portion is a hole.

3. An optical memory card according to claim 2, wherein said hole is sealed by transparent material.

4. An optical memory card according to claim 1, wherein said light-transmitting portion is a notch.

5. An optical memory card according to claim 1, wherein said light-transmitting portion is formed in an area of said card body other than said optical recording portion.

6. An optical memory card according to claim 2, wherein the diameter of said hole is no less than 0.7 mm.

* * * * *